United States Patent [19]

Halterman, Jr.

[11] Patent Number: 5,678,351

[45] Date of Patent: Oct. 21, 1997

[54] DEVICE FOR CASTING SMALL LURES AND FLIES

[76] Inventor: Danny R. Halterman, Jr., Rte. 6, Box 27, Eureka Springs, Ark. 72632

[21] Appl. No.: 581,843

[22] Filed: Jan. 2, 1996

[51] Int. Cl.⁶ .................................................. A01K 91/00
[52] U.S. Cl. ........................... 43/43.1; 43/43.14; 43/43.15
[58] Field of Search ................................ 43/43.1, 43.14, 43/44.98, 43.15

[56] References Cited

U.S. PATENT DOCUMENTS

| | | | |
|---|---|---|---|
| 725,428 | 4/1903 | Evans | 43/43.1 |
| 1,914,164 | 6/1933 | Smith . | |
| 2,157,003 | 5/1939 | Mussina | 43/43.14 |
| 2,270,832 | 7/1942 | Hedge . | |
| 2,589,715 | 3/1952 | Lysikowski | 43/43.14 |
| 2,690,027 | 9/1954 | Russell | 43/44.98 |
| 2,907,133 | 10/1959 | Myers | 43/43.1 |
| 3,318,037 | 5/1967 | Harrison | 43/43.14 |
| 3,346,986 | 10/1967 | Tiikkainen | 43/43.14 |
| 3,464,140 | 9/1969 | Carabasse . | |
| 3,490,166 | 1/1970 | Whisenhunt | 43/44.98 |
| 3,744,166 | 7/1973 | Bondhus . | |
| 3,820,271 | 6/1974 | Martuch . | |
| 3,841,015 | 10/1974 | Gregory . | |
| 4,817,326 | 4/1989 | Benjestorf | 43/43.1 |
| 5,279,066 | 1/1994 | Camera | 43/43.1 |

*Primary Examiner*—Kurt Rowan
*Attorney, Agent, or Firm*—Mark Rogers; Gary N. Speed

[57] ABSTRACT

A castable device for spin or bait casting which forms a static casting loop 15 and makes it possible for an angler to cast small lures or flies 27 with typical spin or bait casting equipment 14. The castable device is comprised of a leading section 10, an intermediate weighted section 11, and a trailing section 12, which attaches between a spin or bait casting line 25, and a leader 26 and fly 27, and provides a static casting loop, when cast.

13 Claims, 2 Drawing Sheets

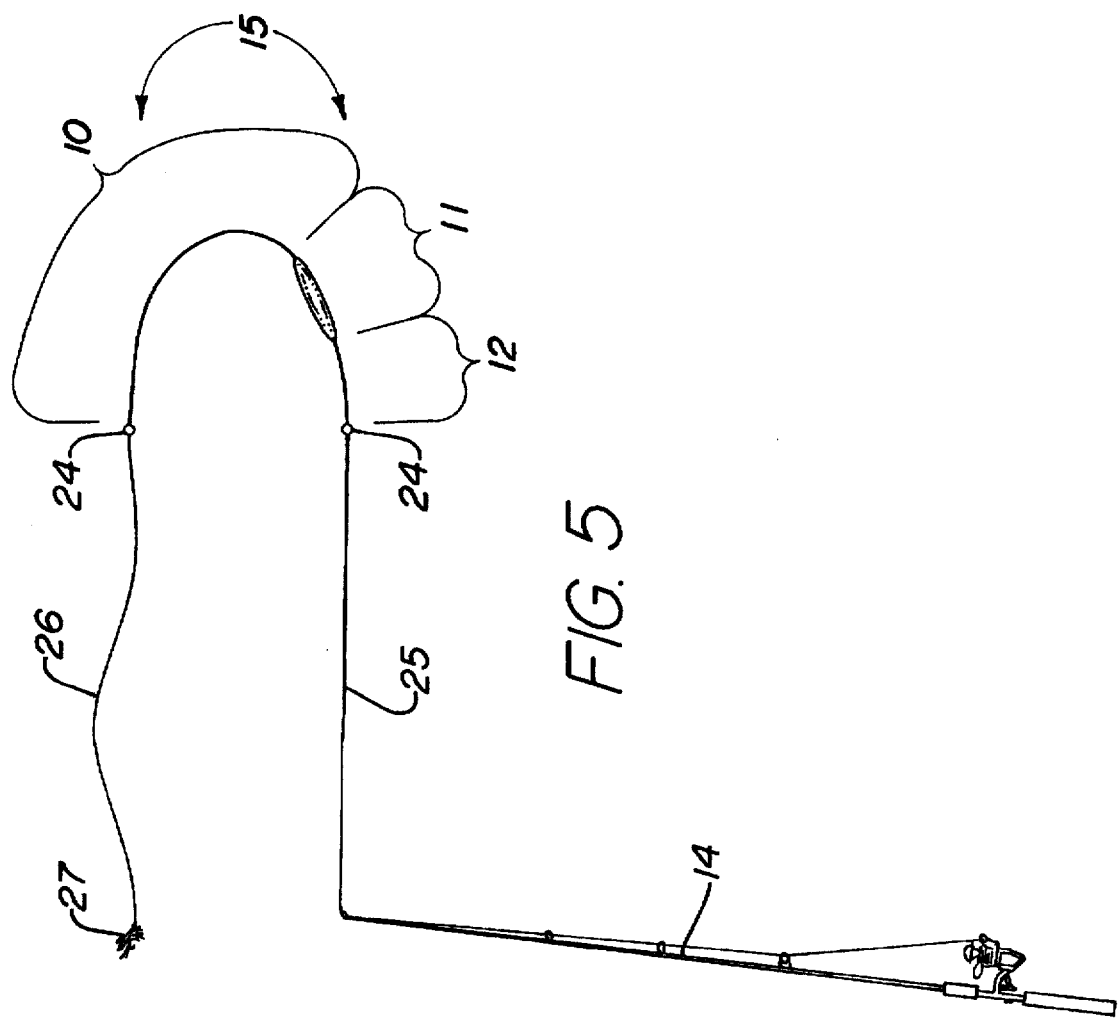

DEVICE FOR CASTING SMALL LURES AND FLIES

BACKGROUND-FIELD OF INVENTION

This invention relates primarily to devices that make it possible for the spin or bait caster to cast very small lures and flies, specifically to an improved castable device that forms a static casting loop in the terminal end of a fishing line.

BACKGROUND-DESCRIPTION OF THE PRIOR ART

The sport of fishing with a hook and line attached to the distal end of a rod began of course, many centuries ago. In its earliest embodiment, the hook was affixed to the terminal end of a relatively short length of line, probably a few feet at most. In turn, the line was attached to the distal end of a long pole or rod. On such a fishing device, all types of bait were used, including natural baits and artificial lures or flies.

New types of equipment have been created to improve the sport, of which one of the most significant was the fishing reel. Early fishing reels performed the very important function of storing additional line. Extra line could then be pulled from the reel to make other types of bait, lure, or fly presentations possible. It was at this point in the early development of the sport that a very divisive practical and philosophical difference arose. Those differences in the approach to sport fishing have today become the very separate disciplines of spin and bait casting, and fly casting. While it is doubtless that these differences began over a century ago, they have become most distinct in the past 50 years since the invention of modern spin and bait casting rods and reels, and specialized fly casting rods and reels.

These opposing approaches to sport fishing differ significantly in their basic physical characteristics. Fly casting is accomplished with specialized equipment which permits casting very small and light weight flies affixed to the terminal end of a relatively heavy length of line. The line itself is thrown, or cast, and its heavy weight delivers the relatively light weight lure or fly to the surface of the water. In other words, the line is cast and the small lure or fly just goes along for the ride.

Fly casting requires longer rods for the most efficiency in casting. Fly casting reels serve basically as line storage devices, but also may incorporate special mechanisms for fighting, or playing, a hooked fish. In casting, the length of fly line to be thrown must be pulled out of the reel. A cast is executed by using the rod to move the entire length of line to be cast in the air, forward and backward, utilizing the weight of the line to load energy into the rod and deliver the line with the small lure or fly to the water. A normal fly casting distance will vary from about 20 to 80 feet. Most fly casting lines are 100 feet or less in length and may incorporate special diameters and tapers to facilitate casting. The proximal end of the fly line is frequently attached to an extra length of line called backing. The backing is usually 300 feet or less in length and plays no role in casting.

Opposingly, spin and bait casting are accomplished by casting a heavy lure or bait that is affixed to the terminal end of a relatively fine diameter and light weight line. The cast is accomplished by the ability of the caster to throw the lure, thus causing the fine diameter and light weight line to be carried along with it to the surface of the water. Unlike fly casting, the line plays no role in the weight needed to execute the cast. In other words, the lure or bait is cast and the line just goes along for the ride.

Spin and bait casting generally require shorter, more resilient rods for casting efficiency. Spin and bait casting reels serve the function of line storage and fish handling, but additionally they are designed to permit line to flow freely from their spool or drum when the lure or bait is cast. In casting, the length of line to be thrown is stored on the reel until the force of the cast pulls it from the reel. A normal spin or bait cast will vary from a few feet to as much as 200 feet. Most spin or bait casting reels will contain up to 750 feet of line.

As sport fishing equipment has continued to develop, the gap between the disciplines has widened. As a result, it has become increasingly impossible for the participants to cast lures, baits, or flies normally cast by the other discipline. While spin and bait casting anglers are able to catch some species of fish very efficiently, there are other species which require the use of small lures or flies to be caught effectively. Small lures or flies are especially productive with some species of game fish, including bream, trout, steelhead, salmon, and bone fish, to name just a few. Even species caught efficiently with spin or bait casting techniques will frequently respond as well or better to fly casting techniques. Since small lures and flies are cast almost exclusively with fly casting lines and equipment, a large number of anglers are not able to take advantage of their effectiveness unless they learn to fly cast and own fly casting equipment. Fly casting is more difficult to learn than spin or bait casting and in general, the basic equipment is much more expensive to purchase. Therefore, it has been desirable for some time to find a system by which small lures or flies can be cast effectively by the spin or bait caster with their respective equipment.

There have been attempts to design a device for casting small lures or flies on spin or bait casting equipment. One such device is described in U.S. Pat. No. 3,744,166 to Bondhus in 1973. It discloses a float made of clear plastic, which may be weighted with variable amounts of water to assist in casting. By casting a small lure or fly with this weighted float affixed to the line, the desired objective is accomplished with some significant restrictions. One major disadvantage is that the float alights on the water with a heavy splash. Such a splash can frighten surface feeding fish and cause them to quit feeding altogether, negating the benefit gained by use of the float. The device does not permit the angler to make use of all terminal tackle and techniques that are commonly employed by the fly caster. In addition, the force and speed of the cast will cause the line to hinge at the heavy float and fold back upon itself. This frequently causes entanglement around the line above the float placement, heretofore a common problem of any device utilized to cast a small lure or fly with spin or bait casting equipment. Once the device is floating on the water, the presence of the heavy float affixed to the line also causes a hinged, or jointed effect to occur between the angler and the small lure or fly. That means that the angler is not in direct contact with the fish when a strike is detected. Therefore, many fish are not hooked.

Another means of rigging that commonly has been employed by some spin and bait casters is called a "slip-float". This installation permits a float to slide up and down a predetermined length of line between stop devices and weights affixed to the line. Entanglement is still a significant problem and the casting process is complicated by the placement of the upper, or proximal, stop device on the line which requires a long length of line to be out of the reel and beyond the tip of the rod when starting the cast. While this does permit an angler to cast a very small lure or fly, it does not cause the float to be an appropriate distance from the lure or fly unless the lure or fly is weighted, whereupon the lure or fly sinks and pulls the line through the float until the proximal stop device rests against the float. Thus it would not function properly for very light weight lures or flies meant to be fished on the surface of the water or only inches below. In addition, it also hinges, or joints the line resulting frequently in failure to hook fish.

To adequately review the prior art, it is necessary also to review patents that were issued in the early days of designing fly casting lines. At that time spinning reels were neither highly developed nor in popular use. Bait casting reels were available and widely used, but not highly refined. Neither spin nor bait casting equipment of that time was utilized or considered reasonably adequate for casting light weight lures or flies. The primary emphasis appeared to be on designing a fly casting line which would adequately deliver a fly to the water with what had become conventional fly casting methods.

One such patent was U.S. Pat. No. 1,914,164 to R. F. Smith in 1932. That patent related a fly casting line which has been marketed in various embodiments and is generally referred to today as a "weight forward, fly casting line". It is still used today and the casting technique has remained generally the same. The patent specification describes in detail that a weight forward section in the line serves to propel the line, and thus the fly, forward to the water. The patent lacks in detailed disclosure of specific lengths, weights, and diameters, though it does at one point describe that the sectional length at the point of maximum diameter is, ". . . perhaps fifteen feet or more". Thus the described line was intended for conventional fly casting techniques and had no application to spin or bait casting techniques.

Another early and relevant patent is described in U.S. Pat. No. 2,270,832 to Hedge in 1941. This patent is relevant in that it relates to a modern fly casting, "line shooting" technique. The process of shooting line with a fly rod and casting a lure with a spin or bait casting rod are similar in their physics, but very different in required equipment and skills. That is to say, the skills required for an angler to properly shoot line, and thus a fly, with fly casting equipment are very different than the skills required to properly execute a cast with spin or bait casting equipment.

It appears that the line described in the Hedge patent was another version of a weight forward fly casting line, with the expressed object, ". . . to provide a line which permits the hook to be deposited upon the water in advance of the line." The drawings and descriptions relate to fly casting equipment and techniques of that era and not to spin or bait casting equipment or techniques. This is particularly noted in that he felt the need to create a "holding portion" of the line. This would be consistent with modern fly casting, line shooting techniques. Modern shooting lines are generally up to 30 feet in length. It is noted that the holding portion of the line is shown in the drawings to be down through the rod guides and located near the reel, the same as with modern shooting lines. I believe it is reasonable from the description and drawings that the line by Hedge was similar in length to modern shooting lines, and thereby intended for use with fly casting equipment.

It is not possible to physically compare my invention to the invention in the Hedge patent. Neither the specifications nor the claims in the Hedge patent give relevant physical parameters relating to lengths, weights, or diameters. There is no description of the methods or materials used in manufacturing. There is no description of the purpose or function of the ". . . plurality of spaced sections." It is unlikely that the line described by Hedge could have been cast with modern day spin or bait casting equipment in a fashion that would have made it possible to deliver a small lure or fly to the water.

In summary, all previous lines or devices created for the purpose of casting small lures or flies suffer from the following disadvantages:

(a) Fly casting with conventional equipment and techniques is difficult to learn, requires a large committment of time, and the equipment tends to be expensive.

(b) Fly casting lines are very long and not adaptable to spin or bait casting equipment or techniques.

(c) Previous devices such as casting bobbers and bubbles are of sufficient weight to facilitate casting with spin or bait casting equipment, but have not permitted the angler to make use of all terminal tackle and techniques commonly employed by the fly caster.

(d) Previous devices splash when hitting the water and tend to frighten fish.

(e) Previous devices hinge the line at the casting device when cast and cause entanglement.

(f) Previous devices further hinge the line on the water and do not permit direct contact with the hook when a fish strikes, thus resulting in missed fish.

(g) Previous devices do not place the castable device an appropriate distance from the small lure or fly in order to get a strike from a fish.

As can be seen from the forgoing discussion, an invention has been needed which would permit an angler the opportunity to cast light weight lures or flies using conventional spin and bait casting equipment, without the need to learn to fly cast or purchase expensive fly casting equipment. My invention has provided those qualifications. My invention has heretofore evaded discovery primarily due to the ever widening division between the two disciplines of spin and bait casting, and fly casting and the great differences in their respective equipment requirements. Creative emphasis has been placed primarily on the development of new lures and bait which can be cast conventionally on spin or bait casting equipment, and not on the likelihood of finding a device to effectively cast small lures and flies. The creation of this invention has required an intimate understanding of the dynamics of both disciplines, a combination of skills not commonly found in designers of fishing tackle.

OBJECTS AND ADVANTAGES

Accordingly, the present invention has several objects and advantages:

(a) to provide a device which will permit an angler to cast very light weight lures and flies with conventional spin and bait casting equipment, thus not requiring the angler to learn conventional fly casting techniques or requiring the purchase of expensive fly casting equipment;

(b) to permit a spin or bait casting angler to utilize all terminal tackle and techniques of the fly caster in presentation of small lures or flies;

(c) to provide a device that will create a static casting loop in the line when cast, preventing entanglement and thus enhancing proper presentation of the small lure or fly;

(d) to provide a device to effectively cast very light weight lures and flies with the smallest possible splash when alighting upon the water;

(e) to provide a device which will deliver the small lure or fly an appropriate distance from the castable device, thus permitting an unsuspecting fish the opportunity to strike;

(f) to provide a device that will permit direct, straight line contact with the fish when it strikes, thus resulting in fewer lost fish.

These and other objects and advantages of the present invention, along with features of novely appurtenent thereto, will appear or become apparent in the course of the following descriptive sections.

DRAWING FIGURES

FIG. 5 shows a view of the relative position of the castable device as it would appear during a cast.

REFERENCE NUMERALS IN DRAWINGS

| | |
|---|---|
| 10 Leading Section | 11 Intermediate Weighted Section |
| 12 Trailing Section | 14 Spin or Bait Casting Equipment |
| 15 Static Casting Loop | 16 Central Core |
| 18 Filler | 20 Outer Covering |
| 24 Connecting Mechanism | 25 Spin or Bait Casting Line |
| 26 Leader | 27 Small Lure or Fly |

DETAILED DESCRIPTION

Figure 1:
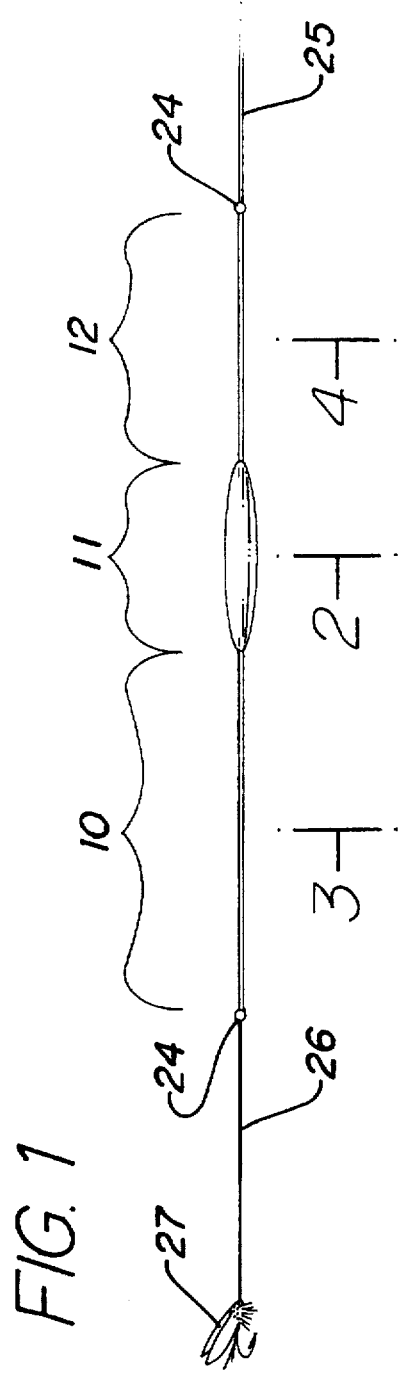
FIG. 1 shows a side view of the castable device.

A typical embodiment of the castable device of the present invention is illustrated in FIG. 1. The materials from which the present invention is manufactured can vary with the requirements for each casting and fishing application. The materials generally used in the manufacture of fly casting lines is applicable to many embodiments. Fly casting lines are currently manufactured by three principle companies in the United States, including; Corland Line Company of Cortland, N.Y., The Outdoor Research Group, Fenwick Company of Huntington Beach, Calif., and 3M Scientific Anglers Company of St. Paul, Minn. In addition, there are other methods and materials which can be used to create the castable device as will be described below.

The castable device shown in FIG. 1 is comprised of three sections. In a typical embodiment, the leading section 10 is typically 50 to 70% of the total length of the castable device. The diameter of the leading section 10 is typically 0.060 to 0.075 inch and of uniform diameter throughout its length. The intermediate weighted section 11 is typically 25 to 30% of the total length of the castable device. The diameter of the intermediate weighted section 11 is greatest at the midpoint of its length and is typically 0.300 to 0.375 inch. The intermediate weighted section 11 is typically constructed of materials which would cause it to have a specific gravity of less than 1.00 with respect to water for floating embodiments, and a specific gravity of more than 1.00 for sinking embodiments. From the midpoint, the intermediate weighted section tapers convexly forward and reverse to a conjoining connection with the leading section 10 and the trailing section 12. The trailing section 12 is typically 10 to 15% of the total length of the castable device. The diameter of the trailing section 12 is typically the same as the leading section 10, or 0.060 to 0.075 inch and of uniform diameter throughout its length. The leading section 10 and the trailing section 12 are terminated at their respective loose ends with a connecting mechanism 24 which serves to connect the leader 26 to the leading section 10 and to connect the spin or bait casting line 25 to the trailing section 12. The connecting mechanism 24 may be formed simply by creating a closed loop in each end of the castable device or by leaving an extention of the central core 16, as depicted in FIG. 2, for direct knotting to the leader 26 and the spin or bait casting line 25.

In its typical embodiment, the castable device in FIG. 1, may range from 18 inches to 72 inches in total length as is determined by other variables including, but not limited to, the length of the casting rod, diameter of the spin or bait casting line 25, weight of the small lure or fly 27 to be cast, diameter or length of the leader 26 connecting the small lure or fly 27 and the leading section 10, or species of fish to be pursued. While specific diameters have been stated above for a typical embodiment, the diameter is largely a function of achieving the desired resiliency and should in no way be limited. The leading section 10 and the trailing section 12 in some embodiments can be manufactured as a continuous taper, thus enhancing their proclivity to form a static casting loop. It is possible for the intermediate weighted section 11 to be manufactured in a broad range of diameters, specific gravities, and weights, and any one of many shapes as might best suit the specific casting needs, including, but not limited to, prolate, cylindrical, round, or elongate teardrop.

Figure 2:
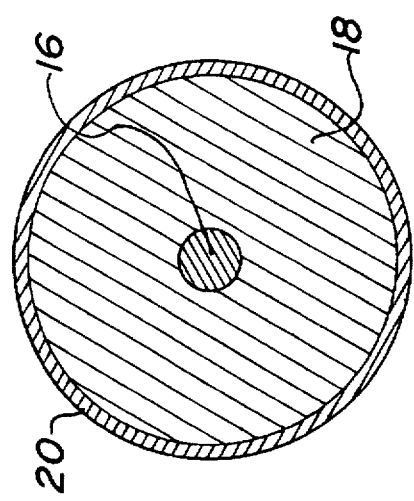
FIG. 2 shows an enlarged transverse sectional view of the castable device taken along the line indicated by 22—22 in FIG. 1.

The intermediate weighted section 11 of the castable device is depicted in FIG. 2 in enlarged transverse sectional view, the section taken along the line indicated by 22—22 in FIG. 1. A central core 16 comprised of single strand or braided filament is coated with filler 18. The central core 16 is continuous throughout the length of the castable device. The filler 18 is placed on the central core 16 only at the location chosen for the intermediate weighted section 11. In its simplest embodiment, the filler used is a sticky filler tape known as "mounting tape", which is built up to the desired thickness in layers. Mounting tape is available in most craft stores. The typical outer covering 20 of the entire assembly, including the leading section 10 and trailing section 12, is typically a plastisol of the type familiar to those skilled in the art of manufacturing fly casting lines. A broad range of materials exist which might be utilized in the manufacture of the intermediate weighted section 11. The filler 18 can be made from urethane foam as is familiar to those skilled in the manufacture of surface fishing lures, or any injectable, closed cell foam. Microballoons, as are familiar to those skilled in the manufacture of fly fishing lines, can be utilized in combination with the plastisol material for the outer covering 20, thus negating the need for the filler 18.

Figure 3:
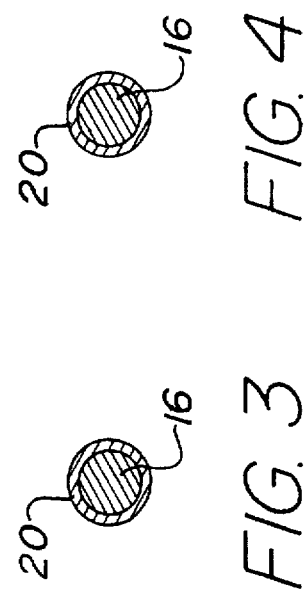
FIG. 3 shows an enlarged transverse sectional view of the castable device taken along the line indicated by 21—21 in FIG. 1.

The leading section 10 of the castable device is depicted in FIG. 3 in enlarged transverse sectional view, the section taken along the line indicated by 21—21 in FIG. 1. Depicted is a central core 16 coated with an outer covering 20. The central core 16 is continuous throughout the castable device. There exists a broad range of material from which the central core 16 can be manufactured, including plastic, polyester, steel, fiberglass, kevlar, or almost any suitable filamentous material. The outer covering 20 is typically a plastisol of the type familiar to those skilled in the art of manufacturing fly casting lines.

Figure 4:
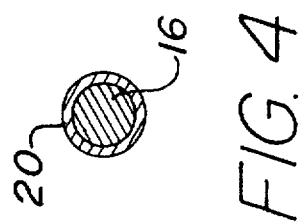
FIG. 4 shows an enlarged transverse sectional view of the castable device taken along the line indicated by 23—23 in FIG. 1.

The trailing section 12 of the castable device is depicted in FIG. 4 in enlarged transverse sectional view, the section taken along the line indicated by 23—23 in FIG. 1. Depicted is a central core 16 coated with an outer covering 20. The description of construction and materials for the trailing section is identical to the description of construction and materials for the leading section given in the above paragraph for FIG. 3.

FIG. 5 depicts the relative positions and interactions of the spin or bait casting line 25, castable device, leader 26, and small lure or fly 27 during a typical cast. The castable device shown in FIG. 5, and as is depicted in FIG. 1, is connected at its leading section 10 with a connecting mechanism 24 to a suitable tapered leader 26 and small lure or fly 27. It is connected at its trailing section 12 with a connecting mechanism 24 to a typical spin or bait casting line 25 and spin or bait casting equipment 14. As is depicted in this FIG. 5, the weight of the intermediate weighted section 11, propels the assembly forward with the force of the cast. The inherent resiliency of the forward and trailing sections, 10 and 12, of the castable device, and the continued relative resiliency of the attached leader 26, causes the small lure or fly 27 to be carried during the cast at the trailing end of the leader 26. As can be seen in the drawing, the entire assembly forms a static casting loop 15. That means that all components, including the castable device, the leader 26, and the small lure or fly 27 remain in the same relative positions throughout the cast.

FIGS. 1-5 are illustrations of only one embodiment of this invention. There exists a broad range of lengths, weights, diameters, tapers, and specific gravities, which can be created to match a broad range of spin and bait fishing equipment and conditions, including but not limited to, type of reel, line capacity of reel, rod length, rod resiliency, rod weights, line weights, lure weights, characteristics of the body of water to be fished and species of fish pursued. Longer rods will make it possible to cast longer or heavier castable devices which will in turn make it possible to cast lures or flies that are heavier in weight or exhibit more friction with the air when cast. Larger bodies of water and larger fish, such as are found in saltwater, will require heavier and longer castable devices to deliver the necessary lures or flies to the fishable water, while small stream fishing for trout or bream will require a more delicate touch with shorter, lighter castable devices.

From the description above, a number of advantages of my castable device become evident:

(a) the castable device provides a means by which an angler can cast very light weight lures and flies with conventional spin and bait casting equipment, thus not requiring the angler to learn conventional fly casting techniques or requiring the purchase of more expensive fly casting equipment;

(b) the castable device permits a spin or bait casting angler to utilize all terminal tackle and techniques of the fly caster in presentation of small lures and flies;

(c) a static casting loop is formed which prevents the fly and leader from becoming entangled with the line above the castable device;

(d) small lures and flies can be cast with spin and bait casting equipment in such a way that fish are not frightened out of feeding patterns with excessive splashing;

(e) the small lure or fly is delivered at an appropriate distance from the castable device which will permit an unsuspecting fish the opportunity to strike;

(f) the castable device permits direct, straight line contact with the fish when it strikes, thus resulting in more hooked fish.

Operation

The castable device as depicted in FIG. 1, installed and cast as is depicted in FIG. 5, is just one of many typical embodiments of my invention. Critical relationships exist in the relative lengths, weights, resiliency and diameters of the three sections comprising the castable device, depending upon the equipment, techniques, and fishing conditions expected. It is the relative weight of the intermediate weighted section 11 which makes it possible to cast the entire terminal tackle assembly, including the castable device, tapered leader 26, and fly 27. Without this weight, it would not be possible to create a forward propulsion which would overcome the air resistance of the small lure or fly 27 and the friction generated by the spin or bait casting line 25 leaving the spin or bait casting equipment 14.

In combination with the forward propulsion of the cast elements, it is also the length, resiliency, and diameter of the leading section 10 and the trailing section 12, which conjoin the intermediate weighted section 11, the length and resiliency of the tapered leader 26 and the weight of the small lure or fly 27, that form the essential, static casting loop 15, characteristic of the utilization of this castable device. It is the static casting loop 15 that makes the delivery of small lures and flies possible.

A static loop is formed when all components, including the castable device, the leader 26, and the small lure or fly 27 remain in the same relative positions throughout the cast. This is not the same type of loop formed by a fly casting line. A typical fly casting loop is a dynamic loop. In practice, both a dynamic loop and static loop achieve the same results in delivery of a small lure or fly. However, the formation of a dynamic loop requires specialized fly casting skills on the part of the caster. A fly casting line, cast in conventional fashion, first forms a loop at the rod tip. If executed correctly, the loop then travels down the length of the casting line until it reaches the terminal end whereupon the entire line is extended and alights on the water. A shooting line as is cast by conventional fly casting techniques, is even more difficult to cast. The loop forms as a dynamic loop, the same as in conventional fly casting. It is the formation of this dynamic loop that again requires specialized fly casting skills on the part of the angler. The rate of formation of the dynamic loop then slows upon release in the shooting motion, but continues to propel forward throughout the remainder of the cast as a dynamic loop. This type of casting frequently requires a technique called "double haul" in fly fishing jargon to execute. Casting shooting lines therefore is more difficult for an angler to learn to cast than conventional fly casting lines.

My invention effectively removes the necessity for all specialized skills by making it possible to form a static casting loop 15, instead of a dynamic loop, when casting small lures or flies. The formation of the static casting loop 15 in casting, is irrespective of technique on the part of the angler, except for properly balancing the total assembly and performing the simple act of throwing it into the air. In as much as it is desireable for the entire assembly of elements to alight on the water simultaneously and in an extended fashion, as is typical in dynamic fly casting techniques, it is sometimes necessary for the angler to slightly arrest the forward progress of the spin or bait casting line 25 just prior to the point of impact upon the water, whereupon the forward motion of the leading section 10, with the tapered leader 26 and small lure 27, overcome the forward progress of the intermediate weighted section 11. The entire assembly of elements then alights in the desired extended fashion. This is a commonly employed technique utilized by spin or bait casting anglers in presentation of typical spin or bait casting lures to a target on the water.

The unexpected formation of the static casting loop 15 is a result of interactions of the relative lengths, resiliency, and diameters of the leading section 10 and trailing section 12 in relationship to the placement of the intermediate weighted section 11. Both the leading section 10 and the trailing section 12 perform a function in formation of the static casting loop 15. The resiliency of the leading section 10, directly influences the formation of the static casting loop 15 as a reaction to wind resistance in forward propulsion. The length and resiliency of the leading section 10 determine the openness of the static casting loop 15.

Surprisingly, it has been determined that the resiliency and length of the trailing section 12 are essential in the aerodynamics of the propelled static casting loop 15. If constructed without the trailing section 12, the static casting loop 15 is smaller and aerodynamically forced down and thus out of the casting arc prematurely. With the trailing section 12 included in the construction of the castable device, the static casting loop 15 is opened larger and aerodynamically lifted. This results in longer casts.

This aerodynamic effect is a result of the position in which the intermediate weighted section 11 is maintained during forward propulsion. If constructed without the trailing section 12, the weighted section 11 is tilted in reverse during forward propulsion at the connection with the spin or bait casting line 25. It thus acts as an air foil and is forced down. If constructed with the trailing section 12, the intermediate weighted section 11 is tilted forward during forward propulsion because of the resiliency of the trailing section 12. This is as depicted in FIG. 5. In this position, the intermediate weighted section 11 acts as an air foil and is forced upward or lifted, thus tending to make the cast longer.

The castable device can be designed to float in a typical embodiment by placing the filler 18 around the central core 16 in a quantity that causes the total castable device to have a specific gravity of less than 1.0. If it is desirable for the castable device to sink in the water, the filler 18 can be eliminated and the plastisol outer covering 20 can be used singularly to achieve a castable device with adequate casting weight and a specific gravity greater than 1.0.

Summary, Ramifications, and Scope

Accordingly, the reader will see that the castable device of this invention is a solution to the problem caused by attempting to cast small lures and flies with conventional spin and bait casting equipment and techniques. The formation of a static casting loop, essential to the proper delivery of the small lure or fly, is achieved without the need for specialized fly casting skills or expensive fly casting equipment. Furthermore, the castable device of this invention has additional advantages in that:

the castable device permits a spin or bait casting angler to utilize all terminal tackle and techniques of the fly caster in presentation of small lures and flies;

small lures and flies can be cast with spin and bait casting equipment in such a way that fish are not frightened out of feeding patterns with excessive splashing;

a static casting loop is formed which prevents the fly and leader from becoming entangled with the line above the castable device;

the small lure or fly is delivered at an appropriate distance from the castable device which will permit an unsuspecting fish the opportunity to strike;

the castable device permits direct, straight line contact with the fish when it strikes, thus resulting in fewer lost fish.

From the foregoing, it will be seen that this invention is one well adapted to obtain all the ends and objects herein set forth, together with other advantages which are inherent to the structure.

It will be understood that certain features and subcombinations are of utility and may be employed without reference to other features or subcombinations. This is contemplated by and is within the scope of the claims.

Although the description above contains many specificities, these should not be construed as limiting the scope of the invention but as merely providing illustration of some of the presently preferred embodiments of this invention. For example, the intermediate weighted section may be made to sink instead of float. It may be asymmetrical in shape as needed to better perform its function in combination with the leading section. There exists a broad range of materials which meet the requirements of the application. The inner core may be made of plastic, polyester, steel, fiberglass, kevlar, or almost any suitable filamentous material. The filler layer may be created by using microballoons, injectable foam, urethane foam, or any suitable foam material which meets the application requirements. The exterior plastisol surface is a standard material recognized in the art of constructing fly casting lines, but other materials exist, such as polyethylene plastic, which may also provide a suitable external plastic surface.

While one embodiment has been described in detail, it will be apparent to those skilled in the art that the disclosed embodiment may be modified. Thus the scope of the invention should be determined by the appended claims and their legal equivalents, rather than by the examples given.

As many possible embodiments may be made of the invention without departing from the scope thereof, it is to be understood that all matter herein set forth or shown in the accompanying drawings is to be interpreted as illustrative and not in a limiting sense.

I claim:

1. A castable device for spin or bait casting, comprised of a leading section adapted for attachment to a leader, an intermediate weighted section, and a trailing section adapted for attachment to a spin or bait casting line; said leading section and said trailing section being of equal and constant diameter and conjoint with said intermediate weighted section; said intermediate weighted section is shorter in length than said leading section and longer in length than said trailing section; the body of said intermediate weighted section being of a continuous taper forward and reverse of a point of maximum diameter.

2. The castable device of claim 1 wherein said intermediate weighted section is comprised of a central core, a filler, and an outer covering.

3. The castable device of claim 1 wherein said intermediate weighted section is comprised of a central core and an outer covering.

4. The castable device of claim 1 wherein said leading section and said trailing section are comprised of a central core and an outer covering.

5. In combination:
(a) a static casting loop means for attachment to a spin or bait casting line, comprised of a leading section, a trailing section, and an intermediate weighted section;
(b) said leading section is fabricated to provide a continuous uniform diameter of 0.060 to 0.075 inch and comprises 50 to 70% of the total length of said static casting loop means;
(c) said trailing section is fabricated to provide a continuous uniform diameter of 0.060 to 0.075 inch and comprises 10 to 15 % of the total length of said static casting loop means;
(d) said intermediate weighted section is fabricated to provide a forward taper and a reverse taper from a point of maximum diameter of 0.300 to 0.375 inch and comprises 25 to 30% of the total length of said static casting loop means, said intermediate weighted section conjoint with said leading section and said trailing section;

(e) said static casting loop means fabricated to provide a total length of 18 to 72 inches, and (f) whereby a static casting loop is formed between said spin or bait casting line and said leader, when cast.

6. The castable device of claim 5 wherein said leading section and said weighted section are fabricated conjointly to provide a continuous taper from said point of maximum diameter of said intermediate weighted section.

7. The static casting loop means of claim 5 wherein said trailing section and said weighted section are fabricated conjointly to provide a continuous taper from said point of maximum diameter of said intermediate weighted section.

8. The castable device of claim 5 wherein said leading section and said intermediate weighted section are fabricated conjointly to provide a continuous taper from said point of maximum diameter of said intermediate weighted section, and said trailing section and said intermediate weighted section are fabricated conjointly to provide a continuous taper from said point of maximum diameter of said intermediate weighted section.

9. A casting device, comprising:

a resilient leading section adapted for attachment to a leader;

a resilient trailing section adapted for attachment to a spin or bait casting line; and an intermediate weighted section extending between said leading section and said trailing section; and wherein said casting device has a length;

said leading section is approximately 50 to approximately 70 percent of said length;

said intermediate section is approximately 25 to approximately 30 percent of said length; and said trailing section is approximately 10 to approximately 15 percent of said length.

10. The casting device of claim 9 wherein said length of said casting device is less than approximately 72 inches.

11. The casting device of claim 10 wherein:

said leading section has a diameter substantially within a range of approximately 0.060 to approximately 0.075 inches over substantially its entire length; and said trailing section has a diameter substantially within a range of approximately 0.060 to approximately 0.075 inches over substantially its entire length.

12. The casting device of claim 11 wherein:

said leading section has a loop at an end thereof for attaching said leading section to a leader; and said trailing section has a loop at an end thereof for attaching said trailing section to a spin or bait casting line.

13. The casting device of claim 12 wherein said castable device has a specific gravity of less than 1.0.

* * * * *